(No Model.)
E. MARATTA.
COAL VAULT GRATING.
No. 350,757. Patented Oct. 12, 1886.
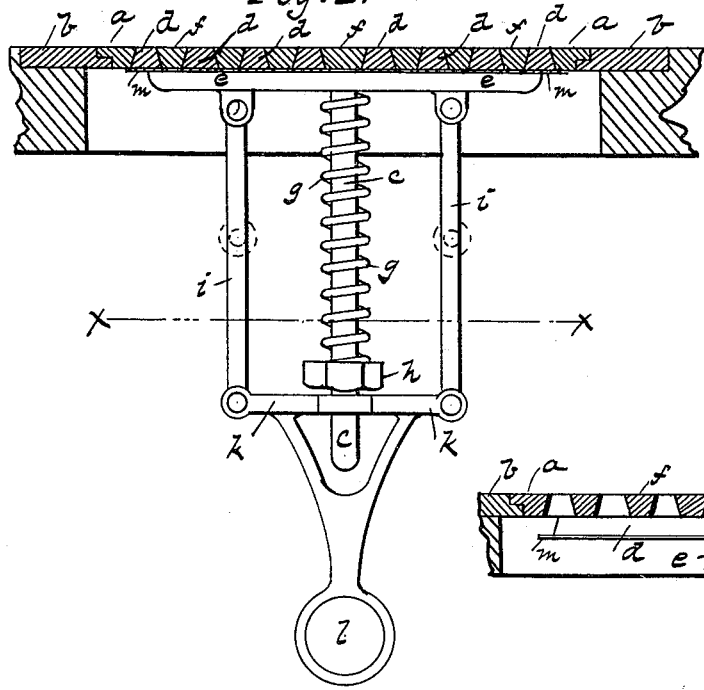
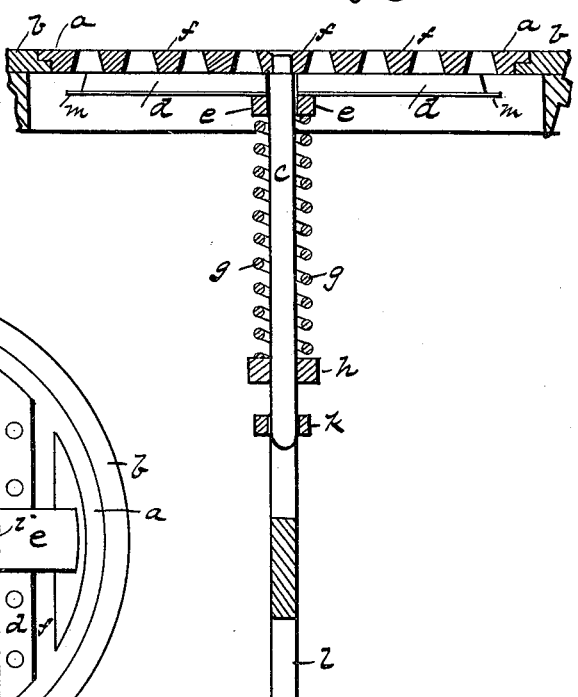
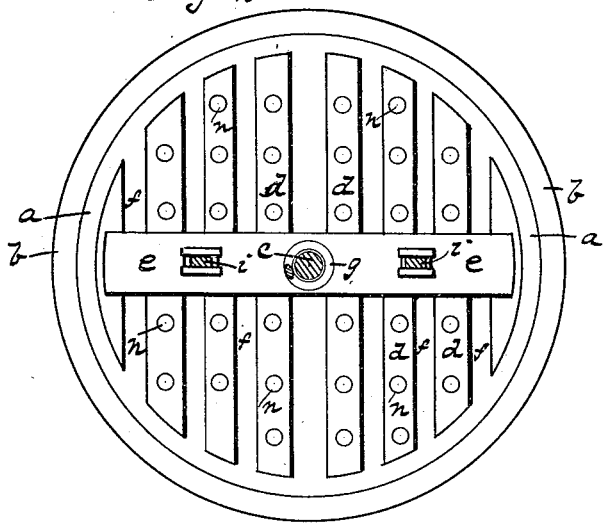
Witnesses:
H. E. Harrison,
James J. Sheehy.
Inventor:
Ella Maratta
Per. C. A. Levis
Attorney

United States Patent Office.

ELLA MARATTA, OF PITTSBURG, PENNSYLVANIA.

COAL-VAULT GRATING.

SPECIFICATION forming part of Letters Patent No. 350,757, dated October 12, 1886.

Application filed May 29, 1886. Serial No. 203,674. (No model.)

*To all whom it may concern:*

Be it known that I, ELLA MARATTA, a citizen of the United States, residing at Pittsburg, in the county of Allegheny and State of Pennsylvania, have invented certain new and useful Improvements in Coal-Vault Gratings; and I do hereby declare the following to be a full, clear, and exact description of the invention, such as will enable others skilled in the art to which it pertains to make and use the same, reference being had to the accompanying drawings, which form a part of this specification.

My invention relates to an improvement in coal-vault gratings, the object being to provide a grating that may be opened or closed at will. This I accomplish by placing a series of bars in the intervening slots or openings of the grating, together with certain other details of construction and combination of parts, as will be more fully described hereinafter.

In the accompanying drawings, Figure 1 is a side elevation of my improved coal-vault grating, partly shown in section, the better to show its working parts. Fig. 2 is a sectional plan view of the same on the line X X, as seen from the under side. Fig. 3 is a sectional elevation of my improved grating, showing the same open for ventilation.

To put my invention into practice, I provide a circular grating, *a*, supported by a grooved ring, *b*, which differs in no essential feature from those now in common use. At the center of this grating *a*, I firmly secure a downwardly-projecting post, *c*, which may either be integral with or attached to the grating. I now provide a number of parallel bars, *d*, attached together by a cross-piece, *e*, and constructed to fit neatly between the bars *f* of the grating *a*. The sides of these bars *d*, together with those of the grating *a*, I prefer to have slightly tapering, which allows the same to be easily separated from each other. A strong spiral spring, *g*, placed about the post *c*, bearing against the cross-piece *e* at one end, and against a nut, *h*, secured to the post *c*, at the other, serves to keep the bars *d* in place. Attached to the cross-bar *e* are two downwardly-projecting rods, *i*, secured together a short distance below the nut *h* by a horizontal bar, *k*, to which a handle, *l*, is attached. About the lower periphery of each of the movable bars *d* is formed an outwardly-extending flange, *m*, which further prevents water or other substance from passing through the grating *a*. Small circular pieces of glass *n* may be set in the bars *d*, which, when the grating is closed, allows the light to enter the vault over which the grating is placed, and a hook attached to the same, for the purpose of locking the grating.

When it is desired to open the grating *a* for the purpose of ventilation, by means of the handle *l* the bars *d* are entirely withdrawn from the grating *a* and revolved at right angles to their former position, which operation leaves a series of square openings formed by the two sets of bars *d* and *f*.

If the openings of the grating *a* are to be closed, the movable bars *d* are revolved back in the same manner as before, and, actuated by the spiral spring *g*, are forced tightly between the bars *f* of the grating *a*.

I am aware that a vault-grating has been formed of parallel bars, the spaces between which are greater at the top than at the bottom, and that wedge-shaped pieces of wood have been inserted in said openings from above downwardly, so that when it is desirable to open any of the slots thus closed the said strips may be driven out of the slots from below upwardly.

Having thus described my invention, what I claim, and desire to secure by Letters Patent, is—

1. In a grating for vaults, the combination consisting of the parallel bars *d*, attached together and constructed to fit neatly in the openings of the grating *a*, the vertical post *c*, secured to the grating *a*, the spiral spring *g*, and nut *h*, and a means whereby the movable bars *d* may be removed from the openings formed in the grating *a* and revolved in such a manner as to prevent the same from entering the said openings.

2. In a grating such as described, the combination consisting of the parallel bars *d*, secured together and constructed to fit neatly in the openings of the grating *a*, the vertical post *c*, secured at the center of the grating *a*, the spiral spring *g*, and nut *h*, the rods *i*, cross-bar *k*, and handle *l*, substantially as set forth.

3. In a grating such as described, the combination of the grating *a*, the movable bars *d*, constructed to fit neatly in openings of the grating a, and a number of circular pieces of glass, n, secured in the bars d or f, whereby light may be admitted to vault over which the grating is placed.

4. A grating for vaults, the parallel openings of which are constructed with tapering sides, forming an opening greater at the base than at the top, in combination with a series of parallel bars having a corresponding taper and secured together by one or more crossbars, and a means whereby the movable bars may be withdrawn or placed in position and revolved at right angles to their former position.

5. A grating for vaults, in combination with the movable bars d, provided with an outwardly-projecting flange, m, the vertical post c, nut h, spiral spring g, the rods i, cross-piece k, and handle l, substantially as and for the purpose set forth.

ELLA MARATTA.

Witnesses:
W. C. BARR,
M. E. HARRISON.